(12) United States Patent
Ito et al.

(10) Patent No.: US 7,444,175 B2
(45) Date of Patent: Oct. 28, 2008

(54) FOLDABLE MOBILE TERMINAL WITH ANTENNAS AND A SELECTOR SELECTING A DIVERSITY TRANSCEIVING SYSTEM BASED ON FOLDING-OUT OR FOLDING-IN TERMINAL

(75) Inventors: Takayoshi Ito, Yokohama (JP); Shuichi Sekine, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

(21) Appl. No.: 10/932,125

(22) Filed: Sep. 2, 2004

(65) Prior Publication Data
US 2005/0143151 A1    Jun. 30, 2005

(30) Foreign Application Priority Data
Dec. 24, 2003    (JP)    ............... 2003-427846

(51) Int. Cl.
*H04M 1/00*    (2006.01)
*H04Q 7/20*    (2006.01)

(52) U.S. Cl. ............... 455/575.3; 455/575.1; 455/90.1; 455/565; 455/425; 455/66.1; 455/90.3

(58) Field of Classification Search ... 455/575.1–575.4, 455/425, 559.1, 66.1, 90.3, 565, 266, 296, 455/277–279, 33.2, 50.1, 562.1; 343/702, 343/703, 724, 751
See application file for complete search history.

(56) References Cited

U.S. PATENT DOCUMENTS

| | | | |
|---|---|---|---|
| 4,992,799 A | 2/1991 | Garay | |
| 6,285,328 B1 | 9/2001 | Masaki et al. | |
| 6,388,627 B1 | 5/2002 | Masaki et al. | |
| 6,628,236 B2 * | 9/2003 | Kim et al. | ............ 343/702 |
| 6,701,167 B2 | 3/2004 | Odachi et al. | |
| 2003/0228891 A1 * | 12/2003 | Kobayashi et al. | ....... 455/575.5 |
| 2005/0143151 A1 | 6/2005 | Ito et al. | |
| 2005/0191978 A1 * | 9/2005 | Spencer et al. | ........... 455/132 |

FOREIGN PATENT DOCUMENTS

| | | |
|---|---|---|
| JP | 403253124 A * | 11/1991 |
| JP | 03-280625 | 12/1991 |
| JP | 11-177485 | 7/1999 |
| JP | 2000-183793 | 6/2000 |
| JP | 2002-171190 | 6/2002 |
| JP | 2003-133991 | 5/2003 |

OTHER PUBLICATIONS

U.S. Appl. No. 11/739,408, filed Apr. 24, 2007, Tsutsumi et al.

* cited by examiner

*Primary Examiner*—Charles N Appiah
*Assistant Examiner*—Emem Stephen
(74) *Attorney, Agent, or Firm*—Oblon, Spivak, McClelland, Maier & Neustadt, P.C.

(57) ABSTRACT

A foldable mobile terminal comprises a pair of housings which are coupled through a hinge to make the terminal foldable, at least one antenna arranged on each of the housings, a switch connected to the antenna, at least one radio unit mounted on one of the housing and connected selectively to the antenna through the switch, and a selector to select a diversity transceiving system according to folding-out or folding-in of the terminal.

19 Claims, 9 Drawing Sheets

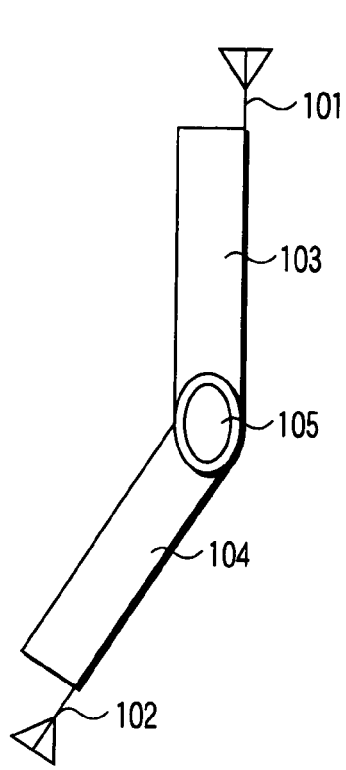
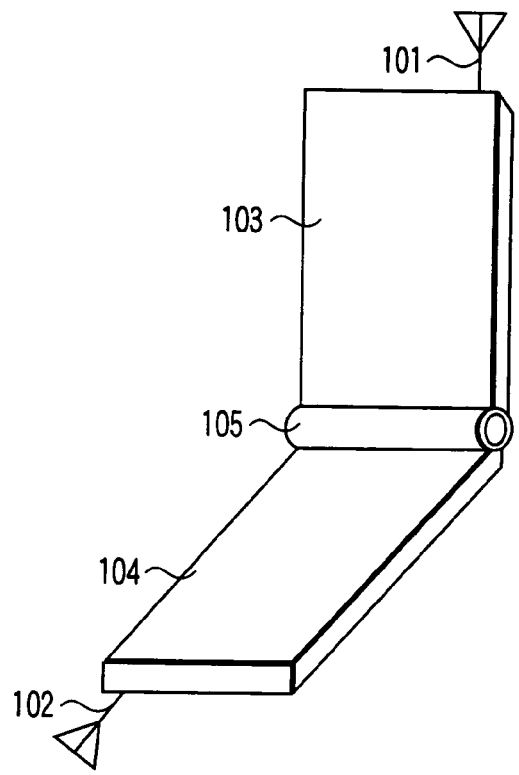
FIG. 1A    FIG. 1B
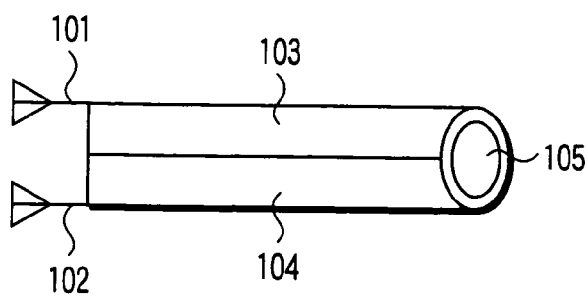
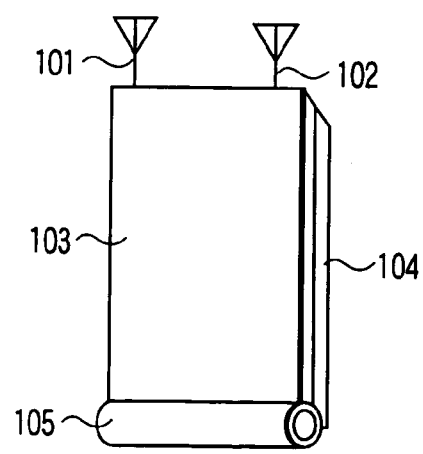
FIG. 1C    FIG. 1D

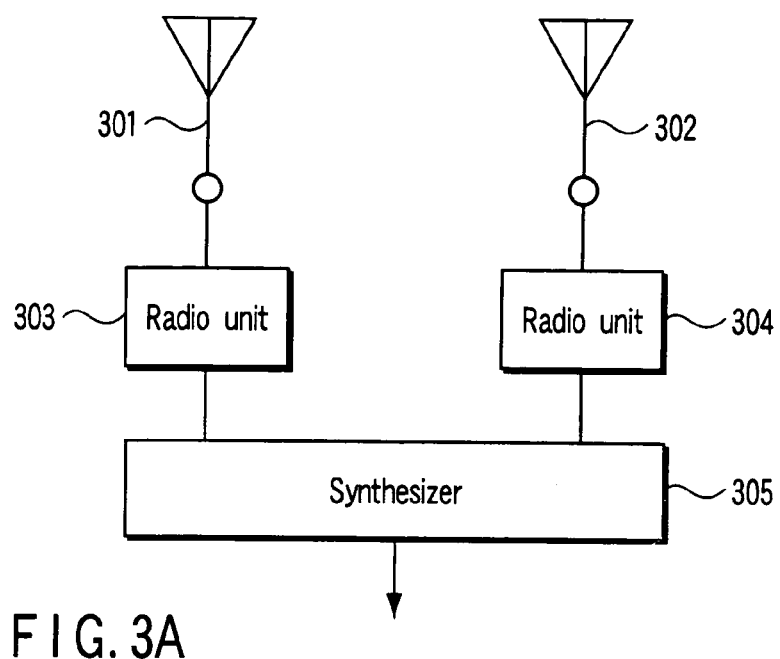
F I G. 3A
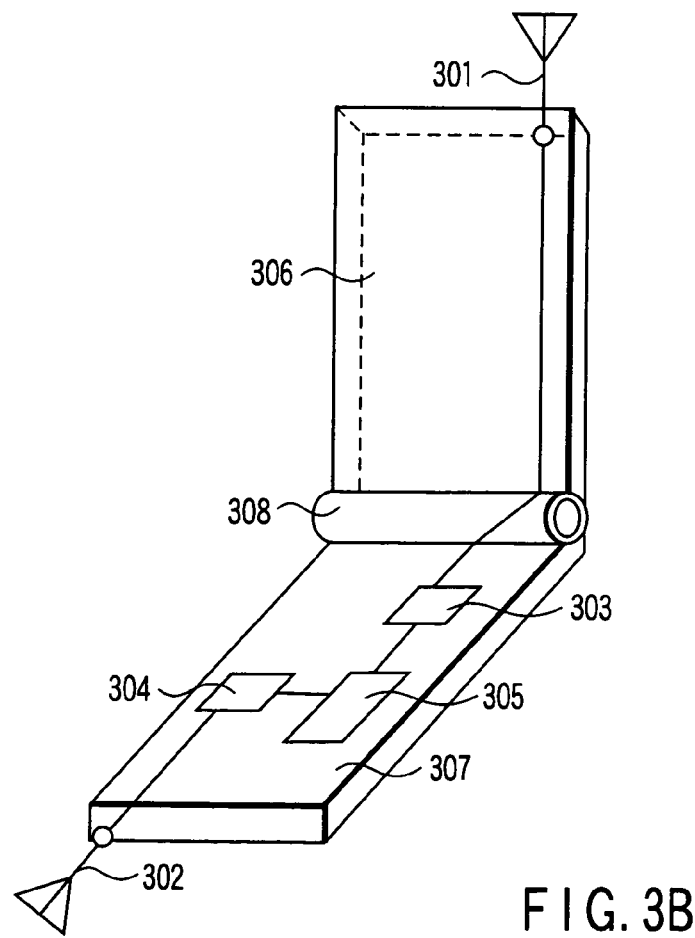
F I G. 3B

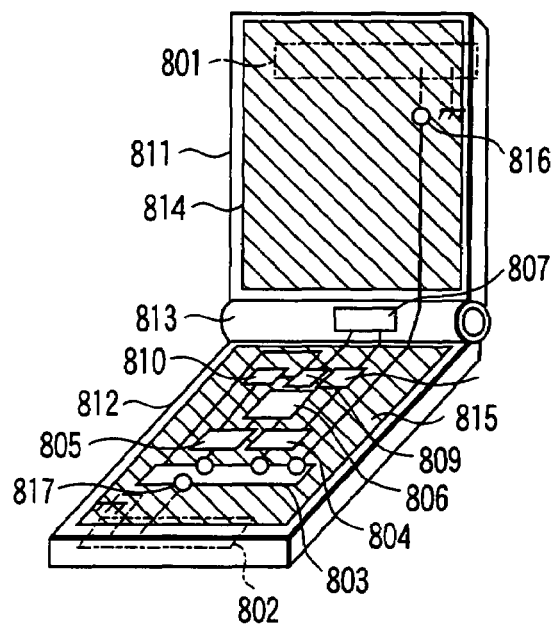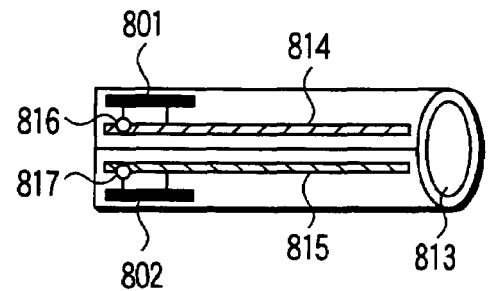
FIG. 8A    FIG. 8B
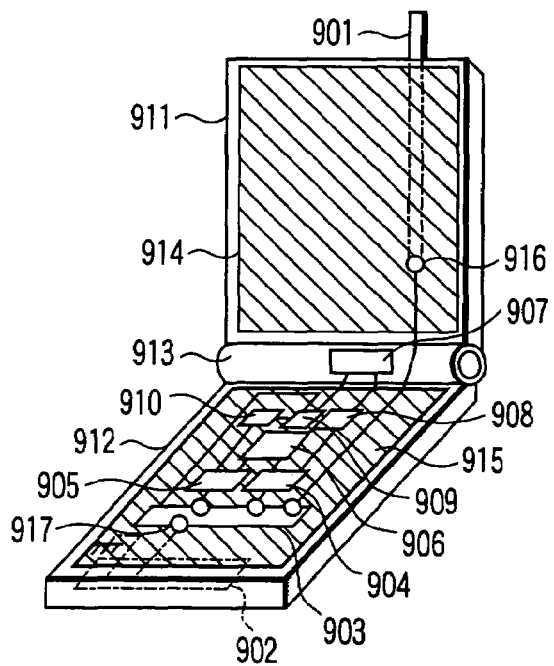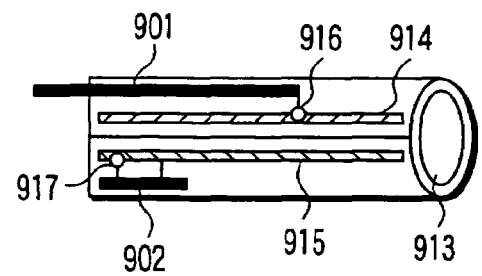
FIG. 9A    FIG. 9B

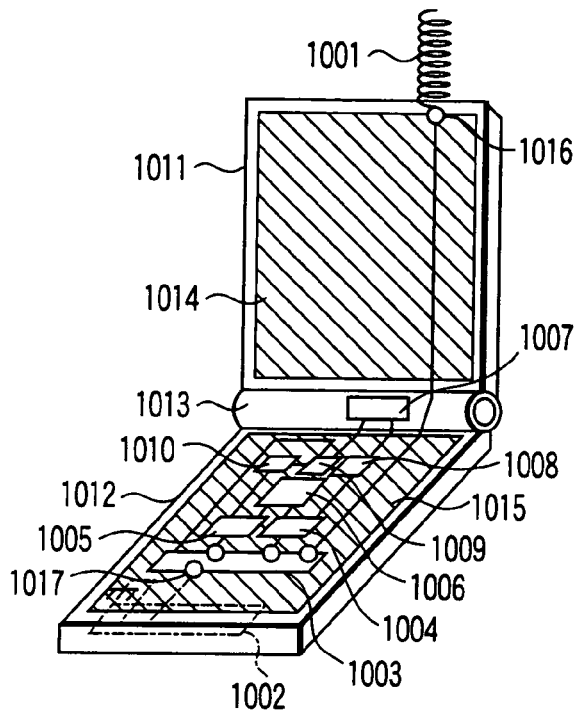
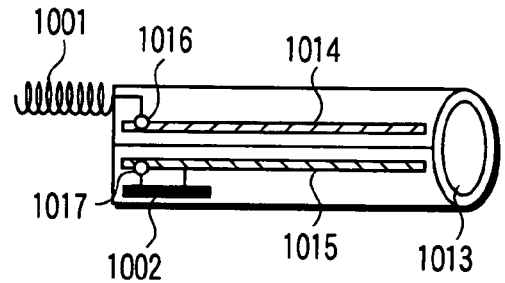
FIG. 10A  FIG. 10B
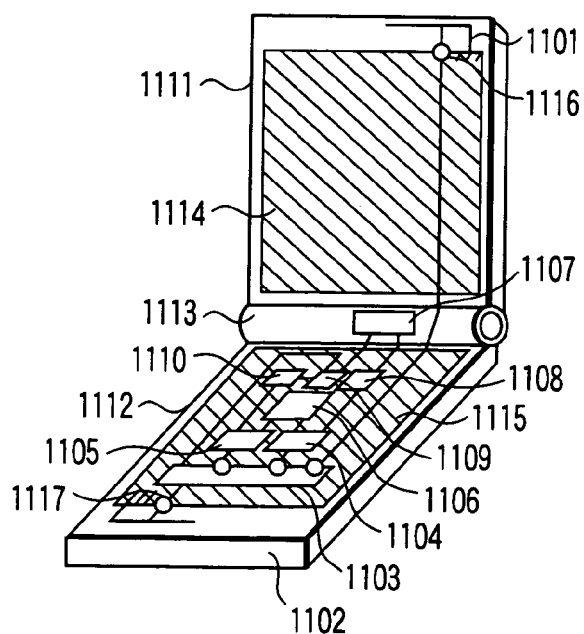
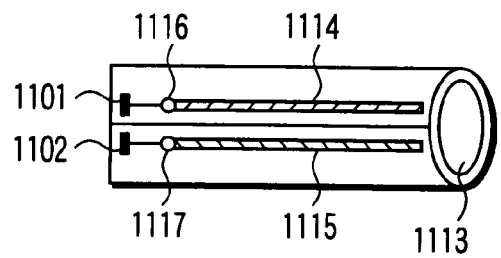
FIG. 11A  FIG. 11B

FOLDABLE MOBILE TERMINAL WITH ANTENNAS AND A SELECTOR SELECTING A DIVERSITY TRANSCEIVING SYSTEM BASED ON FOLDING-OUT OR FOLDING-IN TERMINAL

CROSS-REFERENCE TO RELATED APPLICATIONS

This application is based upon and claims the benefit of priority from prior Japanese Patent Application No. 2003-427846, filed Dec. 24, 2003, the entire contents of which are incorporated herein by reference.

BACKGROUND OF THE INVENTION

1. Field of the Invention

The invention relates to a foldable mobile terminal, more particularly to a mobile terminal of a diversity transceiving system.

2. Description of the Related Art

A conventional foldable mobile terminal of a diversity transceiving system monitors a receive level of a antenna and a channel quality to change a diversity transceiving system (refer to, for example, Japanese Patent Laid-Open No. 2000-183793).

In the above conventional foldable mobile terminal of a diversity transceiving system, correlation between antennas is not considered when the diversity transceiving system is changed. Therefore, there is a problem such as incrementation of power consumption or incrementation of a circuitry scale because a receiving level and a channel quality have to be always monitored. In addition, in an antenna configuration, an antenna whose certain face becomes nondirectional, such as a monopole antenna, is not considered. For this reason, there is a problem that an electrical performance of each antenna may be deteriorated. This results mainly from a circumstance that only communication performance in the state that a majority number of conventional foldable mobile terminals are opened is considered.

It is an object of this invention to provide a foldable mobile terminal changing a diversity transceiving system according to folding-in/folding-out of the foldable mobile terminal.

BRIEF SUMMARY OF THE INVENTION

An aspect of the present invention provides a foldable mobile terminal comprising: a pair of housings which are coupled through a hinge to make the terminal foldable; at least one antenna arranged on each of the housings; a switch connected to the antenna; at least one radio unit mounted on one of the housing and connected selectively to the antenna through the switch; and a selector to select a diversity transceiving system according to folding-out or folding-in of the terminal.

BRIEF DESCRIPTION OF THE SEVERAL VIEWS OF THE DRAWING

FIGS. 1A to 1D show schematic configurations of a mobile terminal according to first to fourth embodiments of the present invention.

FIGS. 3A and 3B show a block circuit of a mobile terminal and a schematic configuration thereof according to the second embodiment of the present invention.

FIGS. 8A and 8B show perspective views of a mobile terminal using an inverse F antenna and of a hinge thereof in the fifth embodiment.

FIGS. 9A and 9B show perspective views of a mobile terminal using an inverse F antenna and a whip antenna and of a hinge thereof in the fifth embodiment.

FIGS. 10A and 10B show perspective views of a mobile terminal using an inverse F antenna and a helical antenna and of a hinge thereof in the fifth embodiment.

FIGS. 11A and 11B show perspective views of a mobile terminal using an inverse F antenna and of a hinge thereof in the fifth embodiment.

DETAILED DESCRIPTION OF THE INVENTION

Figure 2A:
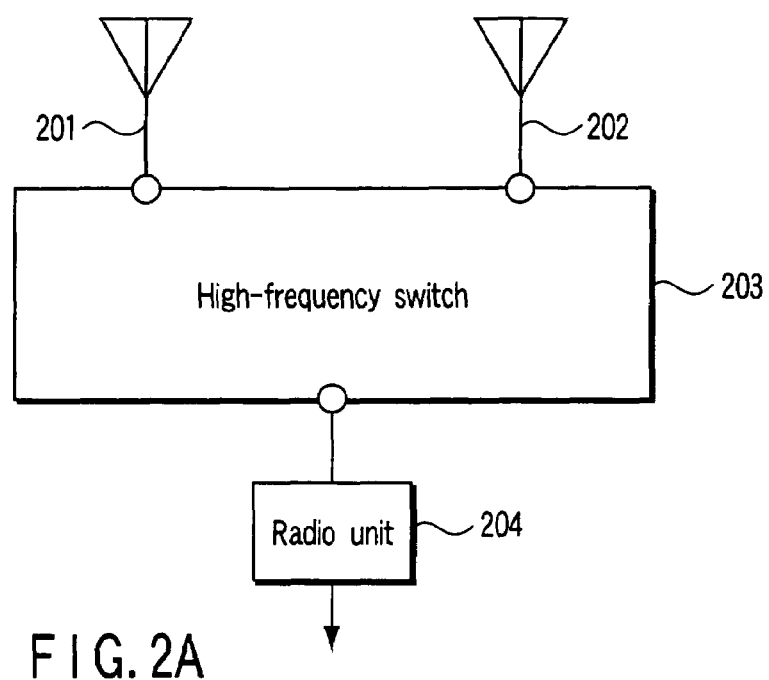
FIGS. 2A and 2B show a block circuit of a mobile terminal and a schematic configuration thereof according to the first embodiment of the present invention.

The embodiments will be described in detail in conjunction with the accompanying drawings.

First Embodiment

The first embodiment of the present invention is described using FIGS. 1A to 2B. FIGS. 1A and 1B show an example of an antenna layout of a foldable mobile terminal. FIGS. 1A and 1B show a side view of the terminal and a perspective view thereof in the state that the terminal is folded out, respectively. FIGS. 1C and 1D show a side view of the terminal and a perspective view thereof in the state that the terminal is folded in, respectively.

The mobile terminal is freely foldable with a first housing 103 and a second housing 104 being coupled to each other by a hinge 105 to be foldable. In FIG. 1C, assuming that the surface that the first housing 103 and the second housing 104 face with each other is an inner face, and the face that they do not face with each other is an outer face. When antennas 101 and 102 are mounted on the first and second housings 104 and 103, respectively, the antennas 101 and 102 are arranged on the outside faces of the first and second housings 104 and 103 at the upper corner of the first housing 103 and the lower corner of the second housing 104, respectively, which are displaced in a width direction of the housing. In other words, the antennas 101 and 102 are arranged on the first and second housings 104 and 103, respectively, in diagonal relationship. By this configuration, when the terminal is folded in, that is, the housings 103 and 104 are closed, the antennas 101 and 102 do not overlap. Also, when the terminal is folded in or folded out, that is, the housings 103 and 104 are closed or opened, the antenna 101 does not contact the housing or the antenna 102. Consequently, degradation of an electrical performance due to contact between the antennas is avoided. Also, the first housing 103 is equipped with a display, a speaker, a camera (not shown), etc. The second housing 104 is equipped with a microphone, a key panel (not shown), etc.

Figure 2B:
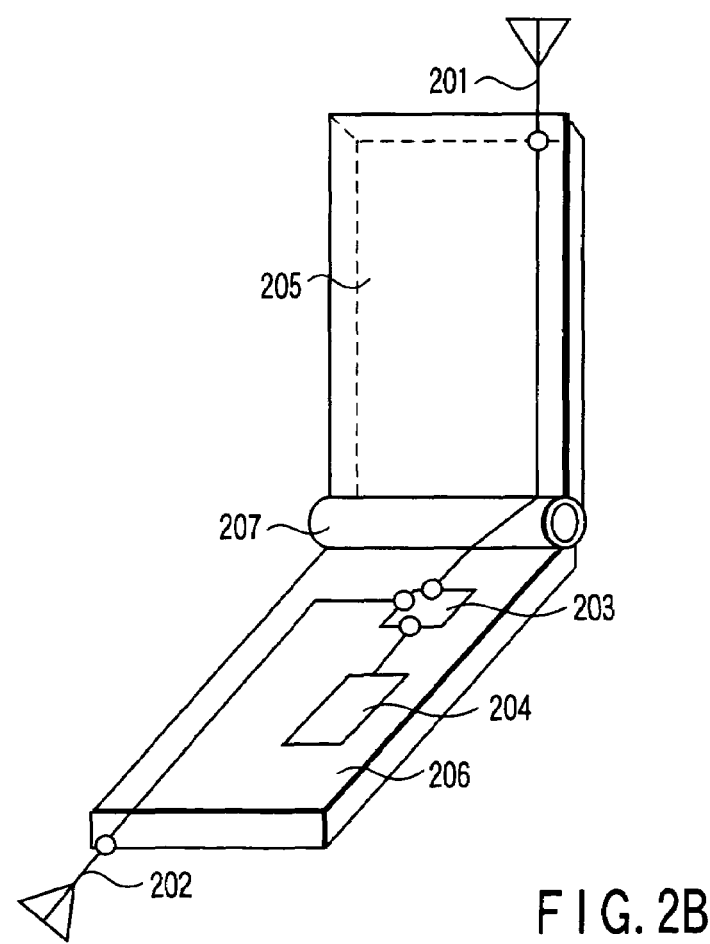

An example of a selective diversity receiving mode to switch the antennas with a switch in this embodiment is described in conjunction with FIGS. 2A and 2B. FIG. 2A shows a block circuit of a selective diversity transceiving system. FIG. 2B shows a mobile terminal of an example of a selective diversity transceiving system.

The first antenna 201 is arranged on, for example, a right upper corner on the outside face of a first housing 205. The second antenna 202 is arranged on a left lower corner of the outside face of the second housing 206. In other words, the antennas 201 and 202 are arranged on the first and second housings 205 and 206, respectively, in diagonal relationship. These antennas 201 and 202 are connected to the high frequency switch 203. The antenna to be connected to the radio unit 204 is selected with this high-frequency switch 203. Then, it is desirable for acquiring an electrical performance not less than that of a single antenna by the selective diversity transceiving system that the first and second antennas 201 and 202 function without degradation of an electrical performance.

According to the embodiment, since the first and second antennas 201 and 202 are arranged so that they do not come in contact with each other, the electrical performance of each antenna does not deteriorate regardless of the folding-in/folding-out of the terminal. Consequently, the selective diversity receiving condition of the present embodiment can obtain an electrical performance not less than a receiving mode using a single antenna. The first embodiment describes an example of a mobile terminal wherein antennas are mounted on the first and second housings, respectively. However, even if two or more antennas are arranged without contacting with each other, the effect not less than the above effect can be expected.

Second Embodiment

The second embodiment of the present invention is described in conjunction with FIGS. 1A to 1D and FIGS. 3A and 3B.

In the present embodiment, there will be described a case of performing a synthesis diversity receiving mode synthesizing the received signals of a plurality of antennas with a synthesizer referring to FIGS. 3A and 3B. FIG. 3A shows a block circuit of a synthesis diversity transceiving system. FIG. 3B shows a mobile terminal with the synthesis diversity transceiving system.

The first antenna 301 is arranged on, for example, a right upper corner of the outside face of a first housing 306. The second antenna 302 is arranged on a left lower corner of the outside face of a second housing 307. In other words, the antennas 301 and 302 are arranged on the first and second housings 306 and 307, respectively, in diagonal relationship. More specifically, the first and second antennas 301 and 302 are arranged so that they do not overlap, when the terminal are folded in. The first and second antennas 301 and 302 are connected to the first and second radio units 303 and 304, respectively.

The first and second radio units 303 and 304 are connected to the synthesis unit 305. The synthesis unit 305 synthesizes detection signals from the first and second radio units 303 and 304 with the phases thereof being matched. Then, it is desirable for acquiring an electrical performance more than that of a single antenna by the synthesis diversity transceiving system that the first and second antennas 301 and 302 function without degradation of an electrical performance.

According to the second embodiment, since the first and second antennas 301 and 302 are arranged so that they do not come in contact with each other, the electrical performance of each antenna does not deteriorate regardless of the folding-in/folding-out of the terminal. Consequently, the synthesis diversity receiving mode of the present embodiment can obtain an electrical performance higher than a receiving mode using a single antenna. The second embodiment describes an example of a mobile terminal wherein antennas are mounted on the first and second housings, respectively. However, even if two or more antennas are arranged without contacting with each other, the effect more than the above effect can be expected.

Third Embodiment

The third embodiment of the present invention will be described in conjunction with FIGS. 1A to 1D and FIGS. 4A and 4B.

Figure 4A:
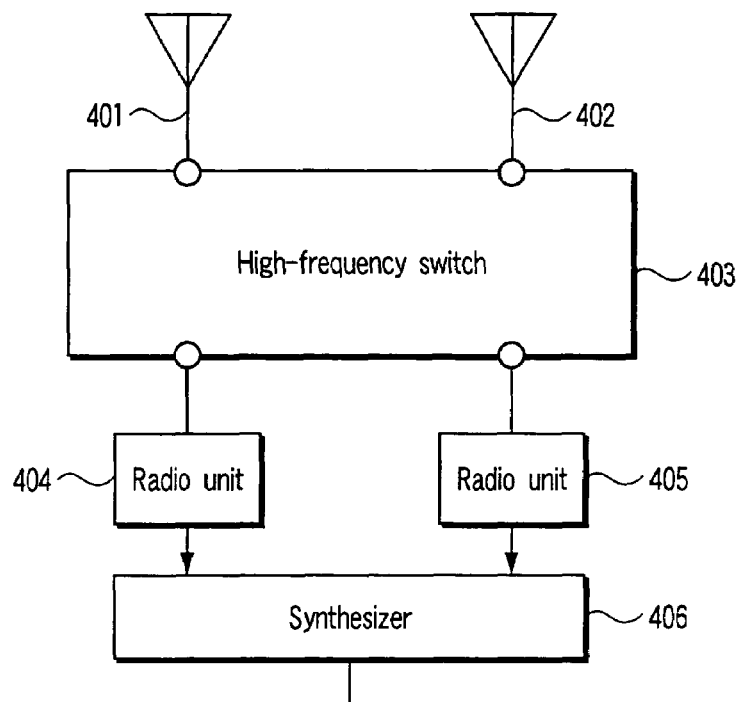
FIGS. 4A and 4B show a block circuit of a mobile terminal and a schematic configuration thereof according to the third embodiment of the present invention.
Figure 4B:
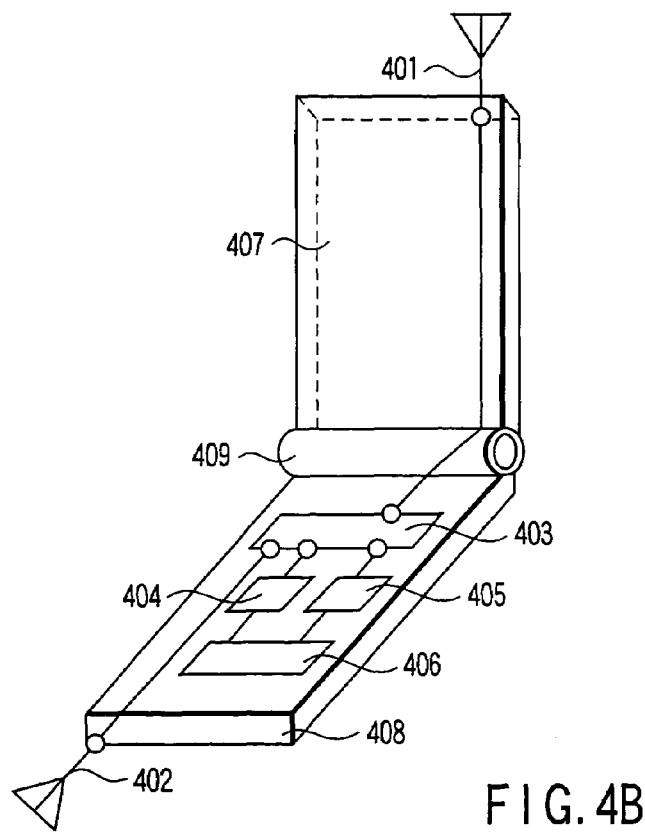

In the present embodiment, an example of a selective diversity receiving mode to switch the antennas with a switch and a synthesis diversity receiving mode to synthesize the received signals of a plurality of antennas by a synthesizer is described in conjunction with FIGS. 4A and 4B.

FIG. 4A shows a block circuit of a mobile terminal performing at least one of the selective diversity transceiving system and the synthesis diversity transceiving system. FIG. 4B shows an example of the radio terminal.

A first antenna 401 is arranged on, for example, a right upper corner of the outside face of a first housing 407. A second antenna 401 is arranged on a left lower corner of the outside face of a second housing 408. In other words, the antennas 401 and 402 are arranged on the first and second housings 407 and 408. respectively, in diagonal relationship. More specifically, the first and second antennas 401 and 402 are arranged so that they do not overlap when the housings are folded. These antennas 401 and 402 are connected to a high-frequency switch 403. The antenna to be connected to the first and second radio units 404 and 405 is selected with this high-frequency switch 403. The first and second radio units 404 and 405 are connected to a synthesis unit 406. The synthesis unit 406 synthesizes detection signals from the first and second radio units 404 and 405 with the phases thereof being matched.

The synthesis diversity transceiving system is compared with the selective diversity transceiving system in the synthesis unit 406. The diversity transceiving system to be used is determined by evaluating a communication performance or a power consumption. Then, in order to acquire an electrical performance not less than that obtained by a single antenna by executing at least either the selective diversity transceiving system or the synthesis diversity transceiving system, it is desirable that the first and second antennas 401 and 402 function without degradation of an electrical performance.

Since the first and second antennas 401 and 402 are arranged so that they do not come in contact with each other in the third embodiment, degradation of an electrical performance of each antenna does not occur regardless of the folding-in/folding-out of the terminal. Therefore, the selective execution of the selective diversity transceiving system and synthesis diversity transceiving system allows providing an electrical performance not less than that obtained by a single antenna. The third embodiment describes an example of a mobile terminal wherein antennas are mounted on the first and second housings, respectively. However, even if two or more antennas are arranged without contacting with each other, the effect not less than the above effect can be expected.

Fourth Embodiment

Figure 5A:
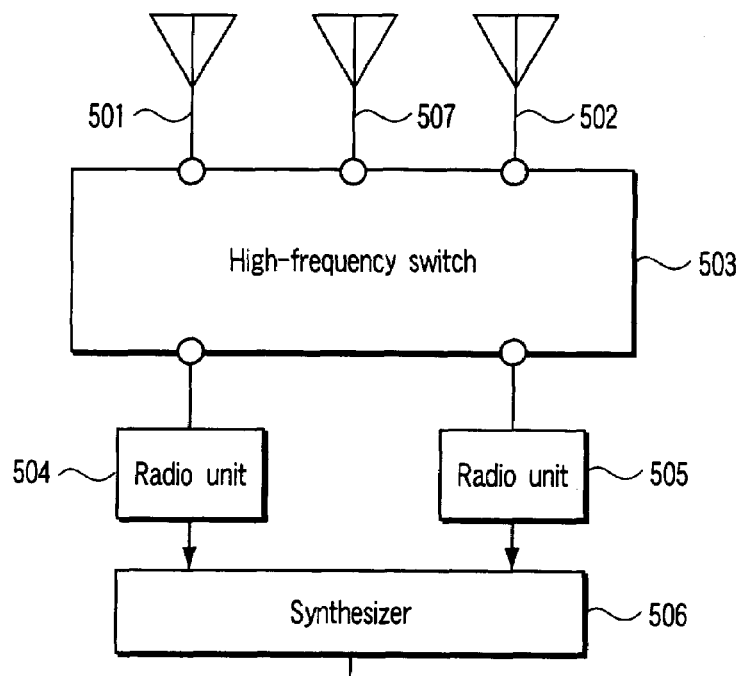
FIGS. 5A and 5B show a block circuit of a mobile terminal and a schematic configuration thereof according to the fourth embodiment of the present invention.
Figure 5B:
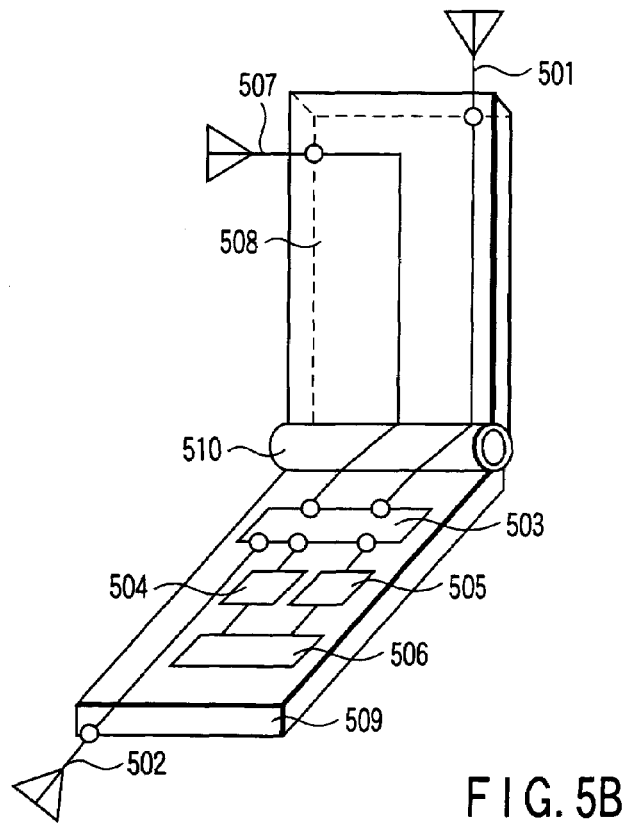

FIGS. 5A and 5B show an embodiment of a mobile terminal in which three antennas are installed. FIG. 5A shows a block circuit of a mobile terminal doing at least either a selection diversity transceiving system or a synthesis diversity transceiving system. FIG. 5B shows an example of configuration of the mobile terminal.

The fourth embodiment of FIGS. 5A and 5B differs from the third embodiment of FIGS. 4A and 4B in the point that a third antenna 507 installed in a first housing 508 is connected to a high-frequency switch 503. In other words, the first antenna 501 is installed in, for example, the right upper corner of the outside face of the first housing 508. The second antenna 502 is installed in a left lower corner of the outside face of the second housing 509, and the antennas 501 and 502 are arranged on the first and second housings 508 and 509, respectively, in diagonal relationship. The third antenna 507 is arranged on the left side corner of the outside face of the first housing 508 so that it is not in contact with the second antenna 502. That is to say, the first and third antennas 501 and 507 are arranged so that they do not overlap the second antenna 502 when the terminal is folded in.

Two antennas of the first, second, third antennas 501, 502 and 507 are selected to allow the synthesis diversity transceiving system. In this embodiment, too, since the first, second and third antennas 501, 502 and 507 are arranged so that they are not in contact with one another, degradation of an electrical performance of each antenna does not occur regardless of the folding-in/folding-out of the terminal. Therefore, this embodiment can obtain an electrical performance not less than that obtained by a single antenna.

Fifth Embodiment

The fifth embodiment of the present invention is described referring to FIGS. 1A to 1D, 6A, 6B, and 7A to 7C.

Figure 6A:
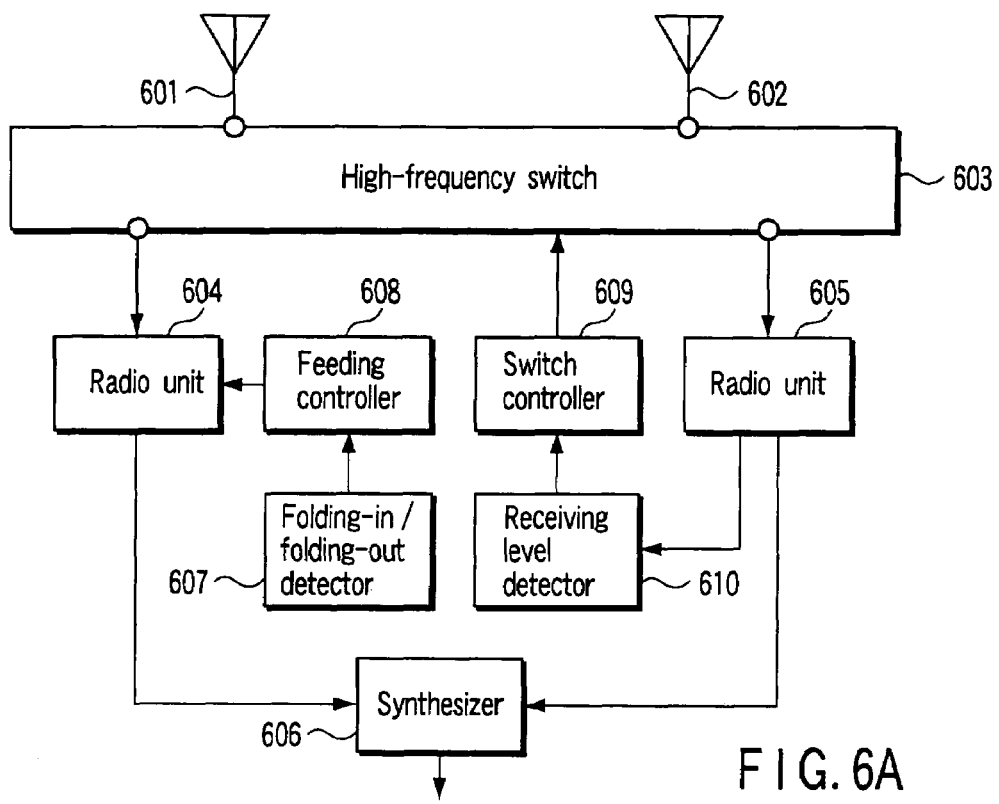
FIGS. 6A and 6B show a block circuit of a mobile terminal and a schematic configuration thereof according to the fifth embodiment of the present invention.
Figure 6B:
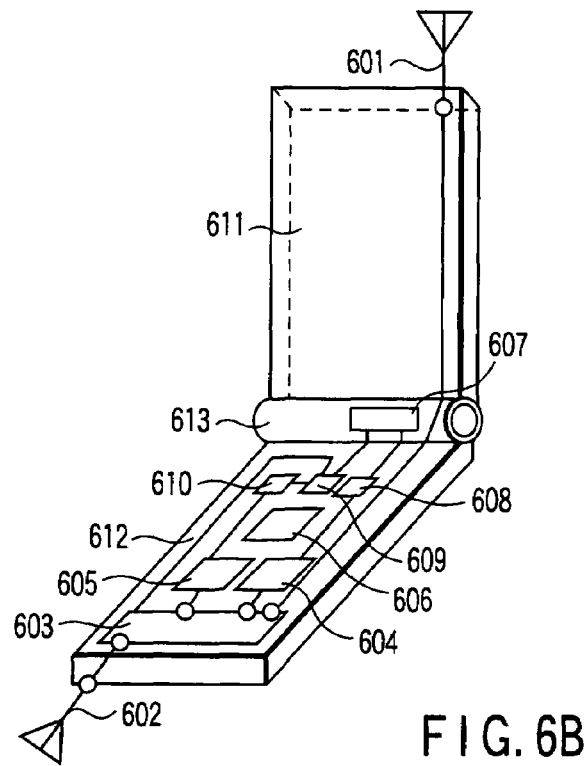

At first, a method of changing the diversity systems is described referring to FIGS. 6A and 6B. FIG. 6A shows a block circuit of a mobile terminal changing a selective diversity receiving mode and a synthesis diversity receiving mode according to the folding-in/folding-out of the terminal. FIG. 6B shows an example of configuration of the mobile terminal.

The first antenna 601 is installed in, for example, a right upper corner of the outside face of the first housing 611. the second antenna 602 is installed in a left lower corner of the outside face of the second housing 612. in other words, the antennas 601 and 602 are arranged on the first and second housing 611 and 612, respectively, in diagonal relationship. More specifically, the first and second housings 601 and 602 are arranged so that they do not overlap when the terminal are folded in. These antennas 601 and 602 are connected to a high-frequency switch 603. This high-frequency switch 603 selects an antenna to be connected to the first and second radio units 604 and 605. The first and second radio units 604 and 605 are connected to a synthesizer 606.

The synthesizer 606 synthesizes detention signal from the first and second radio units 604 and 605 with the phases thereof being matched. A folding-in/folding-out detector 607 notifies a feeding controller 608 and a switch controller 609 of the opening/closing state of the housings 611 and 612, that is, the folding-in/folding-out of the terminal. The folding-in/folding-out detector 607 may comprise a Hall sensor using change of a magnetic field, a reed switch or a changeover switch that is physically pushed by a projection provided inside the housing 611 when the terminal is folded in.

The feeding controller 608 controls a power supply to the first radio unit 604 according to the opening/closing state of the housings. The switch controller 609 controls switching of the high-frequency switch 603 according to the opening/closing state of the housings and a receiving level of the second radio unit 605 notified by a receiving level detector 610.

The control of power supply to the radio unit 604 according to the opening/closing state of the housings and the control of the high-frequency switch 603 are described in conjunction with FIG. 7. FIG. 7 shows only a first antenna 701, a second antenna 702, a high-frequency switch 703, a first radio unit 704, a second radio unit 705, a feeding controller 706, a switch controller 707 in correspondence with the first antenna 601, second antenna 602, high-frequency switch 603, first radio unit 604, second radio 605, feeding controller 606, switch controller 607 of FIG. 6. Other elements shown in FIG. 6 are omitted in FIG. 7.

Figure 7A:
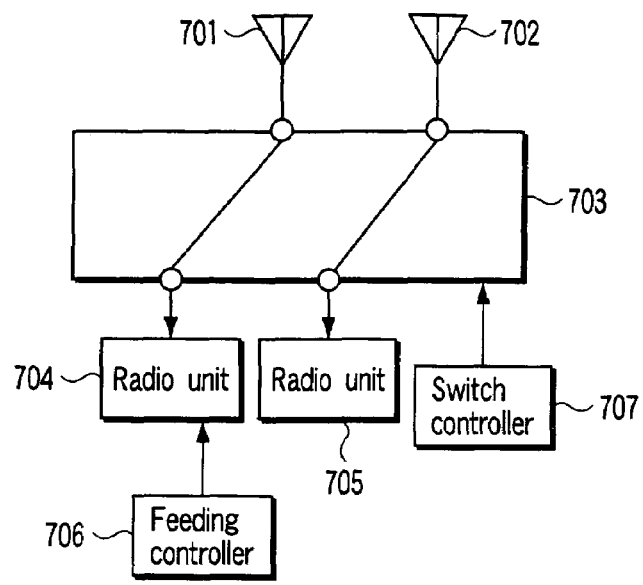
FIGS. 7A to 7C shows block circuits to explain a high frequency switch control in the mobile terminal of the fifth embodiment.

The state that the housings are opened is shown in FIG. 7A. In this state, the feeding controller 706 admits power-supplying to the first radio unit 704. The switch controller 707 controls the high-frequency switch 703 so that the first antenna 701 is connected to the radio unit 704 and the second antenna 701 is connected to the second radio unit 705. The detection signals from the first and second radio units 704 and 705 are synthesized by a synthesizer (not shown) with their phases being matched. As a result, the effect of synthesis diversity transceiving system can be expected.

Figure 7B:
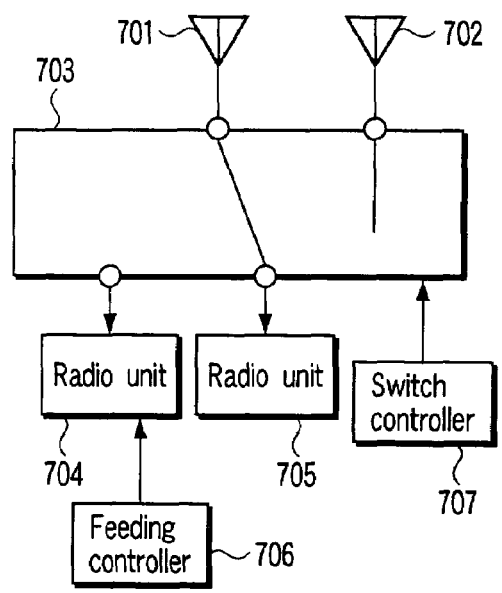
Figure 7C:
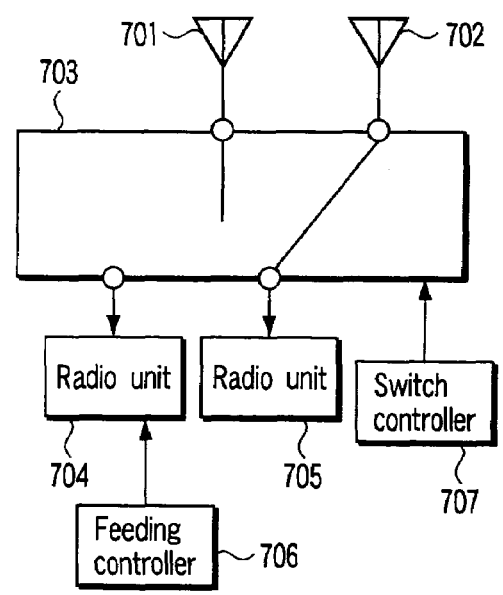

The state that the terminal is folded in is shown in FIG. 7B and FIG. 7C. In this state, the feeding controller 706 stops power-supplying to the first radio unit 704, and the switch controller 707 controls the high-frequency switch 703 to connect the second radio unit 705 to the first antenna 701 or the second antenna 702. In the radio unit 705, a receiving level obtained when the first antenna 701 is connected to the second radio 705 as shown in FIG. 7B is compared with a receiving level obtained when the second antenna 702 is connected to the second radio unit 705 as shown in FIG. 7C. If the radio unit 705 selects the connection indicating the higher receiving level, the effect of the selective diversity transceiving system can be expected.

As discussed above, the synthesis diversity transceiving system is selected when the terminal is folded out. The selective diversity transceiving system is selected when the terminal is folded in. In this case, it is desirable that the first and second antennas 601 and 602 function without degradation of an electrical performance in order to acquire an electrical performance not less than an electrical performance obtained by a single antenna.

According to the configuration of the present embodiment, since an electrical performance of each antenna is not deteriorated regardless of the folding-in/folding-out of the terminal, it is possible to obtain an electrical performance not less than that obtained by a single antenna by performing at least either the selective diversity transceiving system or the synthesis diversity transceiving system.

The folding-out of the terminal lowers the correlation between the antennas to be appropriate for the synthesis diversity transceiving system, because a distance between the first antenna 601 of the first housing 611 and the second antenna 602 of the second housing 612 increases. The folding-in of the terminal enhances the correlation between the antennas due to a pattern diversity effect to be appropriate for the selective diversity transceiving system, because the distance between the first antenna 601 of the first housing 611 and the second antenna 602 of the second housing 612 decreases.

As the installation positions of the first and second antennas 601 and 602 approach the housing end positioned far from the hinge 613, the distance between the antennas when the terminal is folded out increases. For this reason, the correlation between the antennas lowers resulting in increasing the effect of the synthesis diversity transceiving system. Therefore, it is effective to change the diversity system according to the folding-in/folding-out of the terminal.

The concrete antenna elements applied to the embodiment of FIGS. 6A and 6B are explained referring to FIGS. 8A to 11B. FIGS. 8A and 8B show an example adopting inverse F antennas 801 and 802 to first and second housings 811 and 812. FIG. 8A shows the folding-out of the terminal, and FIG. 8B shows the folding-out thereof. The inverse F antennas 801 and 802 are connected to first and second feeding points 816 and 817 provided on the first and second housing substrates 814 and 815, respectively.

Since the inverse F antennas 801 and 802 both are located on the housing end outside the housing and far from the hinge 813 as shown in FIG. 8B, a distance between the antennas is large in the state that the terminal is folded out, and it is small in the state that the terminal is folded in. As described below, when the distance between the antennas is large, correlation between the antennas becomes small due to a space diversity effect. Therefore, the synthesis diversity transceiving system is preferable. When the distance between the antennas is small, the correlation between the antennas becomes small due to a pattern diversity effect. Thus, the selection diversity transceiving system is preferable.

There will be explained a mechanism that the pattern diversity occurs. In the case of the antenna selection diversity transceiving system, the unselected antenna becomes an open end as shown in FIGS. 7B and 7C. In this case, the antenna element can act as a parasitic element. This parasitic element changes a radiation pattern of the selected antenna element. An electromagnetic field coupling occurs between a feed antenna and a parasitic element adjacent thereto, so that a current distribution occurs on the parasitic element. An antenna pattern changes due to radiation from this current. This change makes it possible to lower a correlation coefficient because of a diversity effect to call a radiation pattern diversity. As described above, even if the antennas are adjacent to each other, it becomes possible to suppress a correlation between the antennas by applying a pattern diversity effect. As a result, an improved diversity performance can be realized.

However, this pattern diversity is not suitable for the synthesis diversity transceiving system showing an effect when the antenna element is nondirectional, because it causes a comparatively large distortion on the radiation pattern of the antenna.

On the other hand, in the case of the synthesis diversity transceiving system, too, when viewing from the antenna the other antenna, the other antenna acts like the parasitic element. However, in this case, because both antennas are connected to a radio circuit, an apparent parasitic element is connected to a reflectionless terminal. Since the reflectionless terminal absorbs an induced current generated in the parasitic element due to an electromagnetic field coupling, the change of the radiation pattern of the antenna becomes small in comparison with the selection diversity transceiving system. In other words, when the antennas are adjacent to each other, if the synthesis diversity is done, the space diversity effect and the pattern diversity effect do not act effectively, resulting in the diversity performance is not enough brought out. Accordingly, in this case, it is desirable to use the space diversity which provides a diversity effect by increasing the antenna-to-antenna distance with the terminal being folded out. In this case, two antennas provide inherent radiation characteristics, that is, non-directionalities, because they separate from each other to weaken a coupling. As thus described, when the terminal is folded out, the synthesis diversity transceiving system is preferable, because the radiation patterns of two antennas are substantially nondirectional and the correlation between the patterns is low.

As described above, in this configuration, when two antennas assume as a diversity antenna, it is obvious that the diversity effect varies according to the folding-in/folding-out of the terminal. Further, a diversity reception system suitable for the folded-out terminal or the folded-in terminal is obvious according to the folding-in/folding-out of the terminal. Thus, it is possible to determine an optimum diversity transceiving system according to the folding-in/folding-out of the terminal. As a result, it is unnecessary to monitor a receiving level and a channel quality, and it is possible to suppress incrementation of power consumption and incrementation of a circuit scale.

In FIG. 8, the high-frequency switch 803, the first and second radio units 804 and 805, the synthesizer 806, the folding-in/folding-out detector 807, the feeding controller 808, the switch controller 809, the receiving level detector 810 correspond respectively to the high-frequency switch 603, the first and second radio units 604 and 605, the synthesizer 606, the folding-in/folding-out detector 607, the feeding controller 608, the switch controller 609, the receiving level detector 610 shown in FIG. 6.

FIG. 9 shows an example adopting a whip antenna 901 to a first housing 911, and an inverse F antenna 902 to a second housing 912. FIG. 9A shows a state that the housings open, and FIG. 9B shows a state that the housings close. The whip antenna 901 and inverse F antenna 902 are connected to antenna feeding points 916 and 917 provided on first and second housing substrates 914 and 915, respectively.

As shown in FIG. 9B, the whip antenna 901 and inverse F antenna 902 are arranged outside the housings and the inverse F antenna 902 is located far from the hinge 913. Thus, when the housings open, the antenna-to-antenna distance is large, and when they close, it is small. When the antenna-to-antenna distance is large, the synthesis diversity transceiving system is suitable, because the antenna-to-antenna correlation becomes small due to a space diversity. When the antenna-to-antenna distance is small, the selection diversity transceiving system is suitable, because the antenna-to-antenna correlation becomes small due to a pattern diversity. As described before, since an optimum diversity transceiving system can be selected according to the folding-in/folding-out of the terminal, it is unnecessary to monitor a receiving level or a channel quality, and it is possible to suppress incrementation of a power consumption and a circuit scale.

In addition, since the antennas are arranged so that they do not overlap when the housings close, an electrical performance of each antenna does not deteriorate even when the housings close. Further, the diversity transceiving system can provide an electrical performance more than that obtained by a single antenna.

In FIG. 9, the high-frequency switch 903, the first and second radio units 904 and 905, the synthesizer 906, the folding-in/folding-out detector 907, the feeding controller 908, the switch controller 909, the receiving level detector 910 correspond to the high-frequency switch 603, the first and second radio units 604 and 605, the synthesizer 606, the folding-in/folding-out detector 607, the feeding controller 608, the switch controller 609, the receiving level detector 610 shown in FIG. 6, respectively.

FIGS. 10A and 10B show an example adopting a helical antenna 1001 to a first housing 1011 and an inverse F antenna 1002 to a second housing 1012. FIG. 10A shows a state that the terminal is folded out, and FIG. 10B illustrates a state that it is folded in.

The helical antenna 1001 and inverse F antenna 1002 are connected to antenna feeding points 1016 and 1017 of the housing substrates 1014 and 1015. As shown in FIG. 10B, the helical antenna 1001 and inverse F antenna 1002 are disposed outside the housings, and the inverse F antenna 1002 is arranged far from hinge 1013. Therefore, the antenna-to-antenna distance is large when the terminal is folded out, and it is small when it is folded in.

The synthesis diversity transceiving system is preferable when the antenna-to-antenna distance is large, because the antenna-to-antenna correlation is low due to a space diversity. The selective diversity transceiving system is preferable when the antenna-to-antenna distance is small, because the antenna-to-antenna correlation is low due to a pattern diversity.

As described before, since an optimum diversity transceiving system can be selected according to the folding-in/folding-out of the terminal, it is unnecessary to monitor a receiving level or a channel quality, and it is possible to suppress incrementation of a power consumption and a circuit scale. In addition, since the antennas are arranged so that they do not overlap when the terminal is folded in, an electrical performance of each antenna does not deteriorate even when the terminal is folded in. Further, the diversity transceiving system can provide an electrical performance not less than that obtained by a single antenna.

In FIG. 10A, the high-frequency switch 1003, the first and second radio units 1004 and 1005, the synthesizer 1006, the folding-in/folding-out detector 1007, the feeding controller 1008, the switch controller 1009, the receiving level detector 1010 correspond to the high-frequency switch 603, the first and second radio units 604 and 605, the synthesizer 606, the folding-in/folding-out detector 607, the feeding controller 608, the switch controller 609, the receiving level detector 610 shown in FIG. 6, respectively.

FIG. 11 shows an example adopting inverse F antennas 1101 and 1102 to first and second housings 1111 and 1112, respectively. FIG. 11A shows a state that the terminal is folded out, and FIG. 11B shows a state that it is folded in.

The inverse F antennas 1101 and 1102 are connected to first and second antenna feeding points 1116 and 1117 provided on first and second housing substrates 1114 and 1115, respectively. As shown in FIG. 11B, inverse F antennas 1101 and 1102 are disposed outside the housings, and the inverse F antennas are arranged far from hinge 1113. Therefore, the antenna-to-antenna distance is large when the terminal is folded out, and it is small when it is folded in.

The synthesis diversity transceiving system is suitable when the antenna-to-antenna distance is large, because the antenna-to-antenna correlation is low due to a space diversity. The selective diversity transceiving system is preferable when the antenna-to-antenna distance is small, because the antenna-to-antenna correlation is low due to a pattern diversity.

As described before, since an optimum diversity transceiving system can be selected according to the folding-in/folding-out of the terminal, it is unnecessary to monitor a receiving level or a channel quality, and it is possible to suppress incrementation of a power consumption and a circuit scale. In addition, since the antennas are arranged so that they do not overlap when the terminal is folded in, an electrical performance of each antenna does not deteriorate even when the terminal is folded in. Further, the diversity transceiving system can provide an electrical performance not less than that obtained by a single antenna.

In FIG. 11A, the high-frequency switch 1103, the first and second radio unit 1104 and 1105, the synthesizer 1106, the folding-in/folding-out detector 1107, the feeding controller 1108, the switch controller 1109, the receiving level detector 1110 correspond to the high-frequency switch 603, the first and second radio units 604 and 605, the synthesizer 606, the folding-in/folding-out detector 607, the feeding controller 608, the switch controller 609, the receiving level detector 610 shown in FIG. 6, respectively.

The above embodiment describes an example of a mobile terminal wherein antennas are mounted on the first and second housing, respectively. However, even if two or more antennas are arranged without contacting with each other, the effect not less than the previous effect can be expected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A foldable mobile terminal comprising:
a pair of housings which are coupled through a hinge to make the terminal foldable;
at least two antennas arranged on the housings, respectively, in diagonal relationship to fail to overlap with each other in a state that the terminal is folded in;
a switch connected to the antennas;
at least two radio units mounted corresponding with the antennas on one of the housing and connected selectively to the antennas through the switch; and
a selector to select, only on the basis of whether the terminal is folded-out or folded-in, a synthesis diversity transceiving system for synthesizing detection signals of the radio units when the terminal is folded-out and select a selective diversity transceiving system for selecting one of the antennas that provides a receiving level higher than other of the antennas, when the terminal is folded in.

2. The mobile terminal according to claim 1, wherein the selector comprises a folding-in/folding-out detector to detect folding-in or folding-out of the terminal, and a switch to switch between the synthesis diversity transceiving system and the selective diversity transceiving system according to a detection result of the folding-in/folding-out detector.

3. The mobile terminal according to claim 1, which includes a selector to select one of the antennas after switching to the selective diversity transceiving system.

4. The mobile terminal according to claim 1, further including an antenna installed in the other of the housings.

5. The mobile terminal according to claim 1, wherein each of the antennas installed in the housings respectively comprises an inverse F antenna.

6. The mobile terminal according to claim 1, wherein one of the antennas which is installed in one of the housings comprises a whip antenna, and the other of the antennas which is installed in the other of the housings comprises a reverse F antenna.

7. The mobile terminal according to claim 1, wherein one of the antennas which is installed in one of the housings comprises a helical antenna, and the other of the antennas which is installed in the other of the housings comprises a reverse F antenna.

8. The mobile terminal according to claim 1, further comprising a receiving level detector to detect a receiving level of the radio unit, and a switch to select one of the antennas that provides a higher receiving level than other of the antennas according to a detected result of the level detector.

9. The mobile terminal according to claim 1, wherein the selector includes a synthesizer connected to the radio units to synthesize the detection signals of the radio units in the synthesis diversity transceiving system.

10. The mobile terminal according to claim 9, wherein the synthesizer is configured to synthesize the detection signals with their phases being matched.

11. The mobile terminal according to claim 2, further comprising a feed controller to control power-supplying to the radio unit according to the detection result of the folding-in/folding-out detector.

12. The mobile terminal according to claim 1, wherein when the selector selects the synthesis diversity transceiving system, the antennas are respectively connected to the radio units, and when the selector selects the selective diversity transceiving system, only one of the antennas is connected to one of the radio units.

13. The mobile terminal according to claim 12, wherein when the selector selects the selective diversity transceiving system, the antenna having a highest receiving level is connected to the one radio unit.

14. The mobile terminal according to claim 12, comprising:
a feeding controller controlling power fed to the radio units, wherein when the selector selects the selective diversity transceiving system, the feeding controller cuts off power to one of the radio units.

15. The mobile terminal according to claim 1, comprising:
a feeding controller controlling power fed to the radio units, wherein when the selector selects the selective diversity transceiving system, the feeding controller cuts off power to one of the radio units.

16. A foldable mobile terminal comprising:
a pair of housings which are coupled through a hinge to make the terminal foldable;
at least two antennas arranged on the housings;
a switch connected to the antennas;
at least two radio units connected selectively to the antennas through the switch; and
a switch controller to control the switch to respectively connect the antennas to the radio units in a synthesis diversity transceiving mode for synthesizing detection signals of the radio units when the terminal is folded-out and connect only one of the antennas to only one of the radio units in a selective diversity transceiving mode when the terminal is folded-in.

17. The mobile terminal according to claim 16, comprising:
the antennas arranged in a non-overlapping diagonal relationship with each other in a state that the terminal is folded in.

18. The mobile terminal according to claim 16, wherein when the terminal is folded in, the antenna having a highest receiving level is connected to the one radio unit.

19. The mobile terminal according to claim 16, comprising:
a feeding controller controlling power fed to the radio units, wherein when the terminal is folded-in, the feeding controller cuts off power to one of the radio units.

* * * * *